United States Patent
Myojo et al.

(10) Patent No.: US 10,808,637 B2
(45) Date of Patent: Oct. 20, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi (JP)

(72) Inventors: Keiichi Myojo, Okazaki (JP); Yuki Nose, Kasugai (JP); Eiji Ikuta, Obu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 9 days.

(21) Appl. No.: 15/890,393

(22) Filed: Feb. 7, 2018

(65) Prior Publication Data

US 2018/0252177 A1    Sep. 6, 2018

(30) Foreign Application Priority Data

Mar. 2, 2017 (JP) ................................. 2017-039421

(51) Int. Cl.
F02D 41/14   (2006.01)
F02D 41/00   (2006.01)
(Continued)

(52) U.S. Cl.
CPC ..... *F02D 41/1408* (2013.01); *F02D 13/0203* (2013.01); *F02D 41/008* (2013.01); *F02D 41/0055* (2013.01); *F02D 41/0077* (2013.01); *F02D 41/0082* (2013.01); *F02D 41/025* (2013.01); *F02D 41/0245* (2013.01); *F01N 3/10* (2013.01); *F02D 41/1475* (2013.01); (Continued)

(58) Field of Classification Search
CPC .... F01N 3/10; F02D 13/0203; F02D 41/0055; F02D 41/0077; F02D 41/008; F02D 41/0082; F02D 41/0245; F02D 41/025; F02D 41/1408; F02D 41/1475; Y02T 10/18; Y02T 10/26; Y02T 10/47
See application file for complete search history.

(56) References Cited

U.S. PATENT DOCUMENTS 6,325,041 B1   12/2001   Mamiya et al.

FOREIGN PATENT DOCUMENTS

DE     600 32 399 T2     10/2007
EP     1 026 374 A2      8/2000
(Continued)

OTHER PUBLICATIONS

English Translation of JP 2003120362 (Year: 2003).*

*Primary Examiner* — Anthony Ayala Delgado
(74) *Attorney, Agent, or Firm* — Oblon, McClelland, Maier & Neustadt, L.L.P.

(57) ABSTRACT

A controller for an internal combustion engine is configured to execute a dither control process and an exhaust gas recirculation (EGR) control process. The dither control process includes, when a request to increase a temperature of a catalyst is made, operating the fuel injection valves corresponding to respective cylinders to control the air-fuel ratio in some of the cylinders to become lean and control the air-fuel ratio in other cylinders to become rich. The EGR control process includes operating an adjustment actuator to control an EGR rate. The EGR control process includes operating the adjustment actuator such that the EGR rate is lower when the dither control process is being executed than when the dither control process is not being executed.

7 Claims, 8 Drawing Sheets

(51) Int. Cl.
*F02D 41/02* (2006.01)
*F02D 13/02* (2006.01)
*F01N 3/10* (2006.01)

(52) U.S. Cl.
CPC ............... *Y02T 10/18* (2013.01); *Y02T 10/26* (2013.01); *Y02T 10/47* (2013.01)

(56) References Cited

FOREIGN PATENT DOCUMENTS

| | | |
|---|---|---|
| JP | 2000-104627 A | 4/2000 |
| JP | 2003-120362 A | 4/2003 |
| JP | 2004-068690 | 3/2004 |
| JP | 2013-185536 A | 9/2013 |
| JP | 2014-001649 | 1/2014 |
| JP | 2016-223386 | 12/2016 |

* cited by examiner

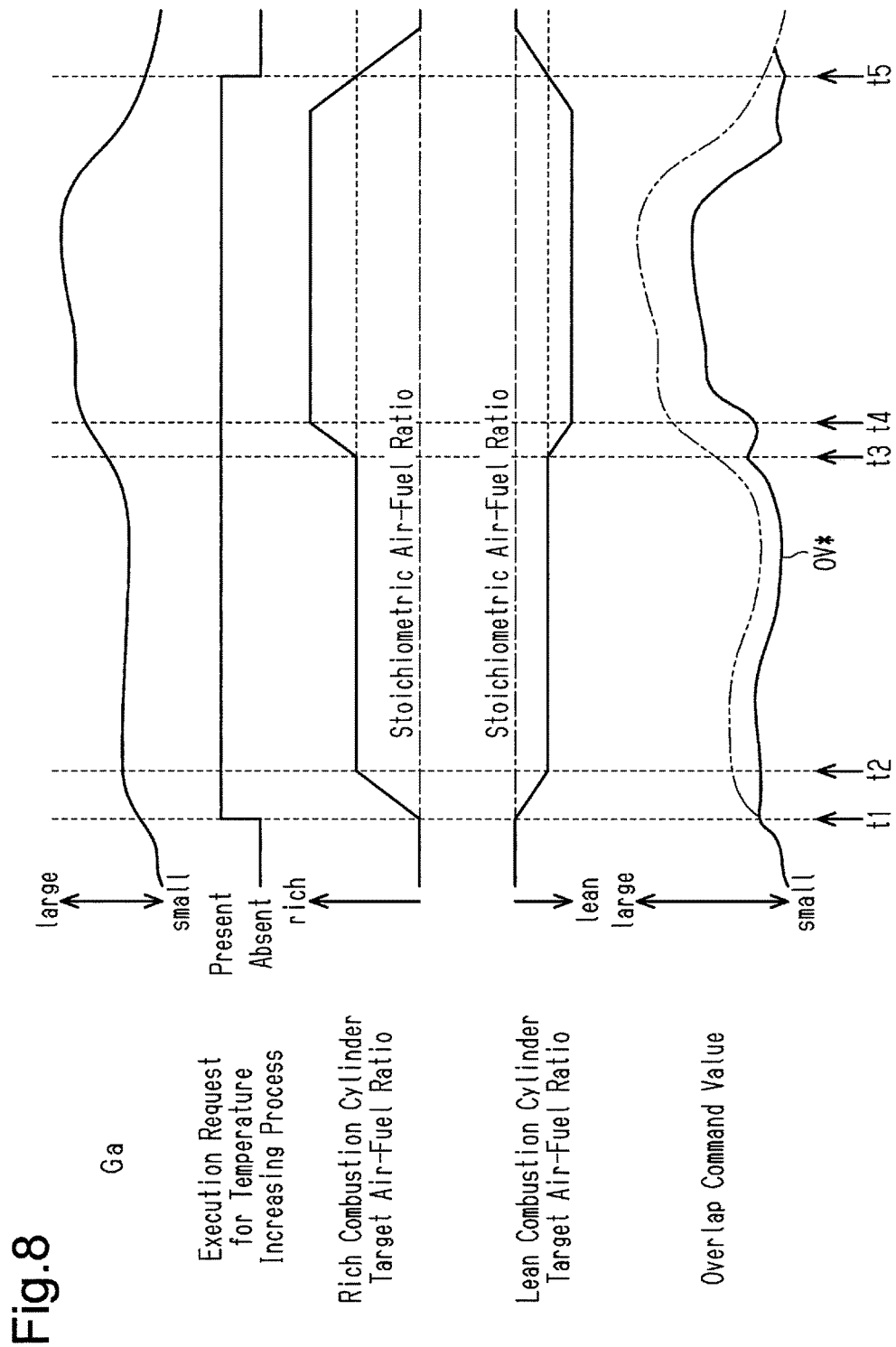

CONTROLLER AND CONTROL METHOD FOR INTERNAL COMBUSTION ENGINE

BACKGROUND

The present disclosure relates to a controller and control method configured to control an internal combustion engine including a catalyst that purifies exhaust gas discharged from multiple cylinders and an adjustment actuator that adjusts the exhaust gas recirculation (EGR) rate.

For example, Japanese Laid-Open Patent Publication No. 2004-68690 describes a controller that executes dither control. In the dither control, when there is a request for execution of sulfur release control of the catalyst in the exhaust passage, the air-fuel ratio is made lean in some cylinders while the air-fuel ratio is made rich in the other cylinders, such that the air-fuel ratio of the engine as a whole becomes the stoichiometric air-fuel ratio or a rich air-fuel ratio.

A known type of controller for an internal combustion engine has been known that executes so-called EGR control to return some of the exhaust gas discharged to the exhaust passage to the intake passage.

The execution of the dither control when the EGR rate is set to a value larger than zero by the EGR control destabilizes the combustion particularly in a cylinder where the air-fuel ratio is made lean as compared with a case in which the dither control is not executed. This can increase the torque fluctuation.

SUMMARY

Example 1. A controller is configured to control an internal combustion engine including a catalyst that purifies exhaust gas discharged from a plurality of cylinders and an adjustment actuator that adjusts an exhaust gas recirculation (EGR) rate. The cylinders include at least one lean combustion cylinder and at least one rich combustion cylinder, which is different from the lean cylinder. The controller is configured to execute: a dither control process, in which, when a request to increase a temperature of the catalyst is made, the controller controls fuel injection valves corresponding to the respective cylinders such that an air-fuel ratio in the lean combustion cylinder is controlled to become leaner than a stoichiometric air-fuel ratio and that an air-fuel ratio in the rich combustion cylinder is controlled to become richer than the stoichiometric air-fuel ratio; and an EGR control process, in which the controller operates the adjustment actuator to control the EGR rate. The EGR control process includes operating the adjustment actuator such that the EGR rate is lower when the dither control process is being executed than when the dither control process is not being executed.

The combustion is more likely to be destabilized when the EGR rate is high than when the EGR rate is low. The combustion is more likely to be destabilized when the dither control is executed than when it is not executed. With the above-described configuration, the adjustment actuator is operated such that the EGR rate is lower when the dither control process is being executed than when it is not being executed. Thus, as compared with a case in which the EGR rate is not lowered at the execution of the dither control process, destabilization of combustion is reduced. Therefore, the above-described configuration limits deterioration of the temperature increasing performance of the dither control while reducing destabilization of combustion.

Example 2. In the controller of Example 1, the dither control process includes a process configured to vary a degree of leanness in the lean combustion cylinder, and the EGR control process includes operating the adjustment actuator such that the EGR rate is smaller when the degree of leanness in the lean combustion cylinder achieved by the dither control process is large than when the degree of leanness is small.

When the dither control process is executed, the combustion is more likely to be destabilized when the degree of leanness in the lean combustion cylinder is large than when the degree of leanness is small. When the EGR control process is executed, the combustion is more likely to be destabilized when the EGR rate is high than when the EGR rate is low. Thus, in the above-described configuration, the EGR rate is made lower when the degree of leanness in the lean combustion cylinder achieved by the dither control process is large than when the degree of leanness is small. This reduces destabilization of combustion while limiting deterioration of the temperature increasing performance of the dither control.

Example 3. In the controller of Example 2, the EGR control process includes a base setting process configured to set a base parameter, which is a parameter for setting an operation amount of the adjustment actuator, based on an operating point of the internal combustion engine, and a guard value setting process configured to set a guard value for the base parameter such that, when the dither control process is being executed, the EGR rate is limited to a smaller when the degree of leanness in the lean combustion cylinder is large than when the degree of leanness is small. The EGR control process is a process configured to operate the adjustment actuator based on a value obtained by subjecting the base parameter to a guard process with the guard value.

When the degree of leanness in the lean combustion cylinder achieved by the dither control is set to a predetermined degree by setting the parameter configured to set the degree of leanness, the EGR rate, which is set by the EGR control process, cannot be unambiguously determined in some cases. In that case, even when the dither control is being executed, the EGR rate, which is set by the EGR control process when the dither control is not being executed, the instability of combustion is kept in an allowable range. Thus, the EGR rate possibly exits the allowable range. In that case, there is a possibility that the EGR rate will be set to an excessively small value if the reduction amount of the EGR rate is set in accordance with the degree of leanness of the dither control process. Therefore, in the above-described configuration, the guard value is set in accordance with the degree of leanness in the lean combustion cylinder in the dither control process to restrict the EGR rate from being excessively reduced by the guard value. This prevents the EGR rate from being excessively low while reducing destabilization of combustion.

Example 4. In the controller of any one of Examples 1 to 3, the internal combustion engine includes an EGR passage, which connects an exhaust passage and an intake passage with each other, and an EGR valve actuator, which adjusts a flow cross-sectional area of the EGR passage. The adjustment actuator includes the EGR valve actuator.

Example 5. In the controller of any one of Examples 1 to 3, the internal combustion engine includes an intake-side variable valve timing actuator configured to vary opening timing of an intake valve, and an exhaust-side variable valve timing actuator configured to vary opening timing of an exhaust valve. The adjustment actuator includes the intake-side variable valve timing actuator and the exhaust-side variable valve timing actuator. The EGR control process includes a process configured to cause the opening timing of the intake valve to be more delayed and the opening timing of the exhaust valve to be more advanced when the dither control process is being executed than when the dither control is not being executed.

With the above-described configuration, by delaying the opening timing of the intake valve and advancing the opening timing of the exhaust valve, the overlap period, during which the intake valve and exhaust valve are both open, is shortened to reduce the EGR rate. Furthermore, the above-described configuration executes both of the process of delaying the opening timing of the intake valve and the process of advancing the opening timing of the exhaust valve. As a result, unlike a case in which only one of the two processes is executed, the configuration minimizes the deviation of the opening timing of the intake valve and the opening timing of the exhaust valve when the overlap period is shortened from the opening timing of the intake valve and the opening timing of the exhaust valve when the overlap period is not shortened.

Example 6. A method for controlling an internal combustion engine is applied to control an engine including a catalyst that purifies exhaust gas discharged from a plurality of cylinders and an adjustment actuator that adjusts an exhaust gas recirculation (EGR) rate. The cylinders include at least one lean combustion cylinder and at least one rich combustion cylinder, which is different from the lean cylinder. The method includes: executing a dither control process configured to control, when a request to increase a temperature of the catalyst is made, fuel injection valves corresponding to the respective cylinders such that an air-fuel ratio in the lean combustion cylinder is controlled to become leaner than a stoichiometric air-fuel ratio and that an air-fuel ratio in the rich combustion cylinder is controlled to become richer than the stoichiometric air-fuel ratio; and executing an EGR control process configured to operate the adjustment actuator to control the EGR rate. The EGR control process includes operating the adjustment actuator such that the EGR rate is lower when the dither control process is being executed than when the dither control process is not being executed.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 8 is a timing diagram showing an example of movements of values in dither control according to the embodiment.

DESCRIPTION OF THE PREFERRED EMBODIMENTS

First Embodiment

A controller 70 and control method for an internal combustion engine 10 according to a first embodiment will now be described with reference to the drawings.

Figure 1:
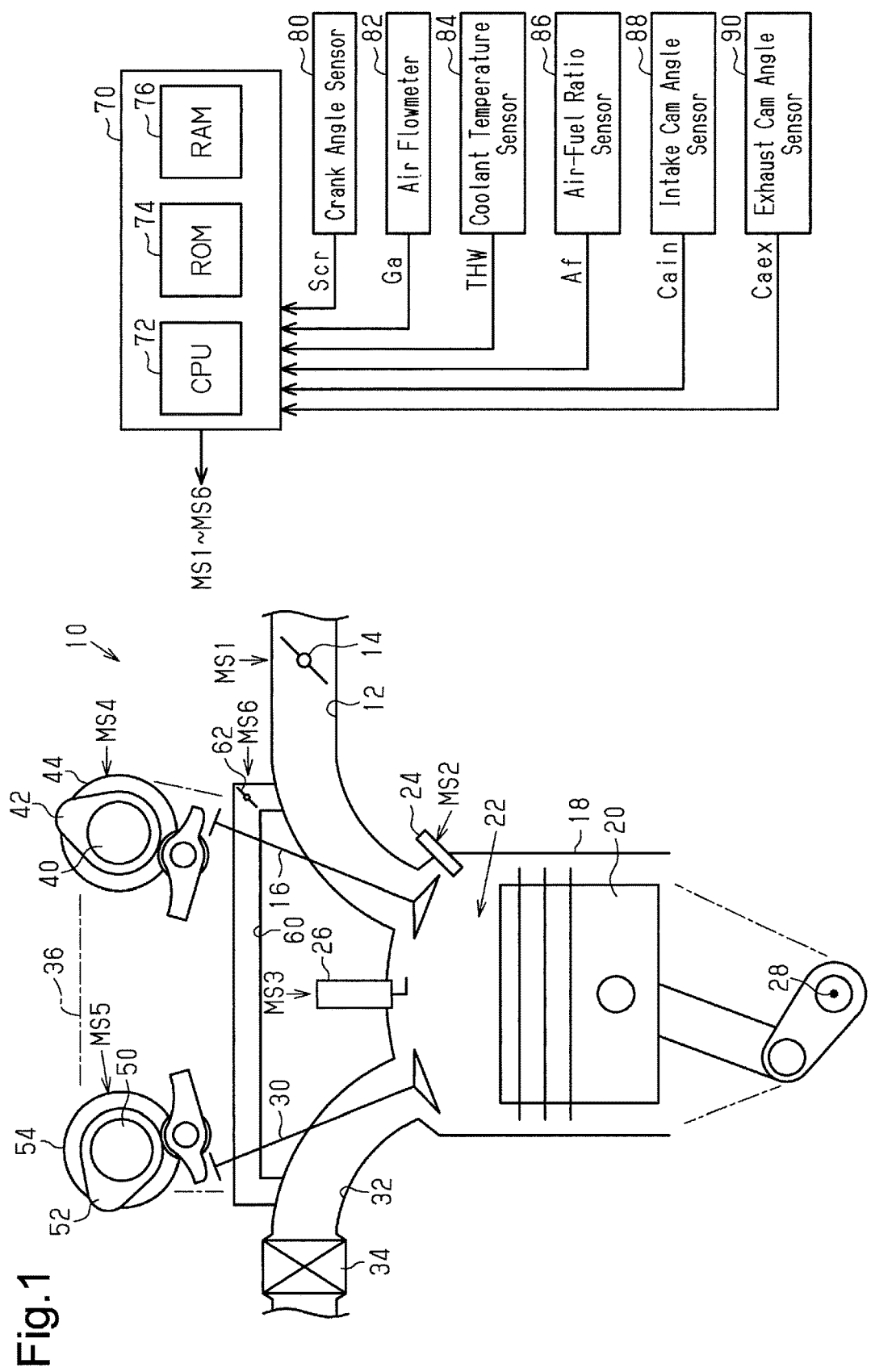
FIG. 1 is a diagram of a controller according to one embodiment and an internal combustion engine.

As shown in FIG. 1, an intake passage 12 of the internal combustion engine 10 is provided with a throttle valve 14, which adjusts the flow cross-sectional area of the intake passage 12. As an intake valve 16 is opened, the air flowing into the section downstream of the throttle valve 14 in the intake passage 12 via the throttle valve 14 flows into a combustion chamber 22, which is defined by a cylinder 18 and a piston 20. A fuel injection valve 24 configured to inject fuel into the combustion chamber 22 protrudes in the combustion chamber 22. Also, an ignition device 26 projects into the combustion chamber 22.

The air-fuel mixture of the air flowed into the combustion chamber 22 from the intake passage 12 and the fuel injected from the fuel injection valve 24 is burned by the spark discharge of the ignition device 26.

The combustion energy at this time is converted into rotational energy of crankshaft 28 by the piston 20. The air-fuel mixture burned in the combustion chamber 22 is discharged to the exhaust passage 32 as exhaust gas when the exhaust valve 30 is opened. A three-way catalyst 34 configured to purify exhaust gas is provided in the exhaust passage 32.

The intake valve 16 is selectively opened and closed by an intake cam 42 driven by an intake camshaft 40. Rotational force of the crankshaft 28 is applied to the intake camshaft 40 via a timing chain 36 and an intake-side variable valve timing device 44. The intake-side variable valve timing device 44 is an actuator that varies the difference (phase difference) of the rotation angle of the intake camshaft 40 with respect to the rotation angle of the crankshaft 28. When the phase difference is changed by the intake-side variable valve timing device 44, the opening timing of the intake valve 16 is changed.

The exhaust valve 30 is selectively opened and closed by an exhaust cam 52 driven by an exhaust camshaft 50. Rotational force of the crankshaft 28 is applied to the exhaust camshaft 50 via the timing chain 36 and an exhaust-side variable valve timing device 54. The exhaust-side variable valve timing device 54 is an actuator that varies the difference in rotation angle (phase difference) of the exhaust camshaft 50 with respect to the rotation angle of the crankshaft 28. When the phase difference is changed by the exhaust-side variable valve timing device 54, the opening timing of the exhaust valve 30 is changed.

The intake passage 12 is connected to the exhaust passage 32 via an EGR passage 60. The EGR passage 60 is provided with an EGR valve actuator 62, which changes the flow cross-sectional area of the EGR passage 60.

The controller 70 is configured to control the internal combustion engine 10. The controller 70 is configured to operate various actuators such as the throttle valve 14, the fuel injection valve 24, the ignition device 26, the intake-side variable valve timing device 44, and the exhaust-side variable valve timing 54 in order to control the controlled variables such as the torque of the internal combustion engine 10 and exhaust components. When controlling the controlled variables, the controller 70 receives output signals from a crank angle sensor 80, which detects the crank angle, or the rotation angle of the crankshaft 28, an air flowmeter 82, which detects an intake air amount Ga, a coolant temperature sensor 84, which detects the temperature of the coolant of the internal combustion engine 10 (coolant temperature THW). In addition, the controller 70 receives output signals from an air-fuel ratio sensor 86, which detects an air-fuel ratio Af based on the exhaust component in the section in the exhaust passage 32 upstream of the three-way catalyst 34, an intake cam angle sensor 88, which detects an intake cam angle Cain, or the rotation angle of the intake camshaft 40, and an exhaust camshaft angle sensor 90, which detects an exhaust cam angle Caex, or the rotation angle of the exhaust camshaft 50.

The controller 70 includes a CPU 72, a ROM 74, and a RAM 76. The controller 70 controls the above controlled variables by causing the CPU 72 to execute programs stored in the ROM 74.

Figure 2:
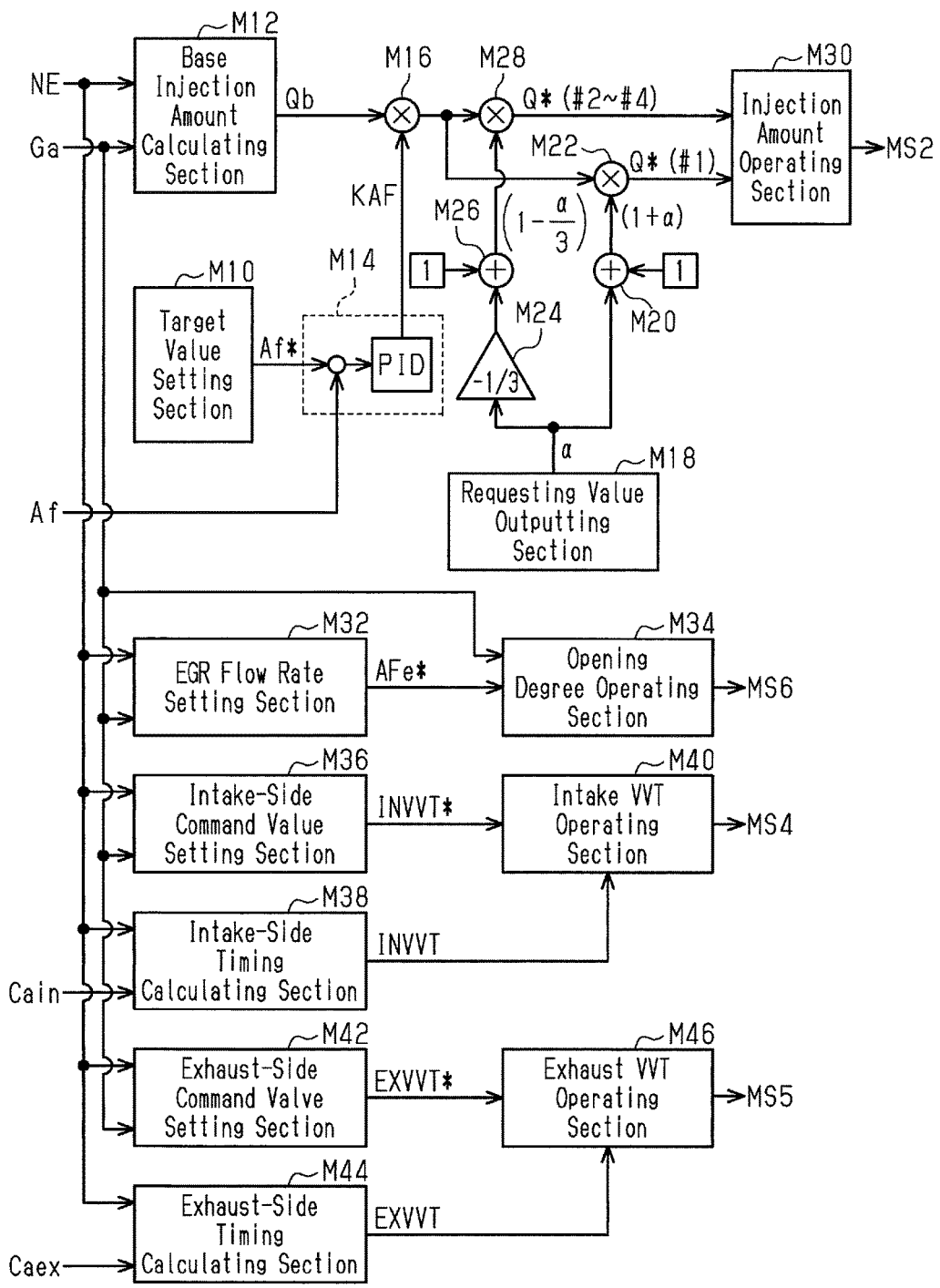
FIG. 2 is a block diagram showing part of the process for generating an operation signal of the actuator according to the embodiment.

FIG. 2 shows part of the process configured to control the controlled variables. The process shown in FIG. 2 is implemented by the CPU 72 executing programs stored in the ROM 74.

A target value setting section M10 sets a target value Af* of the air-fuel ratio of the air-fuel mixture in the combustion chamber 22. In the present embodiment, the target value Af* is set to the stoichiometric air-fuel ratio. Based on the intake amount Ga and the engine speed NE, which is calculated based on an output signal Scr of the crank angle sensor 80, a base injection amount calculating section M12 calculates a base injection amount Qb, which is an operation amount for executing open-loop control to cause the air-fuel ratio of the air-fuel mixture in the combustion chamber 22 to become the target value Af*.

A feedback section M14 calculates a feedback operation amount KAF, which is an operation amount for executing feedback control to cause the air-fuel ratio Af, which is detected by the air-fuel ratio sensor 86, to become the target value Af*. In the present embodiment, the air-fuel ratio Af is subtracted from the target value Af*. The remainder is used to obtain a proportional element, an integral element, and a differential element. The sum of the output of these elements is used as the feedback operation amount KAF.

A feedback correcting section M16 corrects the base injection amount Qb by multiplying the base injection amount Qb by the feedback operation amount KAF.

When a request to increase the temperature of the three-way catalyst 34 is made, a requesting value outputting section M18 calculates a correction requesting value α, while setting, to the target value Af*, the mean value of the air-fuel ratios in the cylinders #1 to #4 of the internal combustion engine 10. The correction requesting value α is used in dither control configured to make the air-fuel ratios different between the cylinders. In the dither control according to the present embodiment, the first cylinder #1 is a rich combustion cylinder, in which the air-fuel ratio is made richer than the target value Af*, and the second to fourth cylinders #2 to #4 are lean combustion cylinders, in which the air-fuel ratio is leaner than the target value Af*. The injection amount in the rich combustion cylinder is calculated by multiplying the output value of the feedback correcting section M16 by a value (1+α). The injection amount in the lean combustion cylinder is calculated by multiplying the output value of the feedback correcting section M16 by a value (1−(α/3)).

Regarding the first cylinder #1, A correction coefficient calculating section M20 adds the correction requesting value α to 1 to calculate the correction coefficient for the output value of the feedback correcting section M16. A dither correcting section M22 multiplies the output value of the feedback correcting section M16 by the correction coefficient (1+α) to calculate the injection amount command value Q* for the first cylinder #1.

A multiplication section M24 outputs a value obtained by multiplying the correction requesting value α by −⅓. Regarding the second to fourth cylinders #2 to #4, a correction coefficient calculating section M26 adds the output value of the multiplication section M24 to 1 to calculate the correction coefficient for the output value of the feedback correcting section M16. A dither correcting section M28 multiplies the output value of the feedback correcting section M16 by the correction coefficient (1−(α/3)) to calculate the injection amount command value Q* for the second to fourth cylinders #1 to #4.

An injection amount operating section M30 generates an operation signal MS2 for each fuel injection valve 24 based on the injection amount command value Q*. The injection amount operating section M30 outputs the operation signal MS2 to the corresponding fuel injection valve 24 to operate the fuel injection valve 24 such that the amount of fuel injected from the fuel injection valve 24 becomes the injection amount command value Q*.

Based on the engine speed NE and the intake air amount Ga, an EGR flow rate setting section M32 calculates an EGR flow rate command value AFe*, which is a command value for the flow rate of the exhaust gas flowing into the intake passage 12 via the EGR passage 60 (EGR flow rate). An opening degree operating section M34 changes the opening degree, which is the operation amount of the EGR valve actuator 62, by outputting an operation signal MS6 to the EGR valve actuator 62 based on the EGR flow rate command value AFe* and the intake air amount Ga.

An intake-side command value setting section M36 sets an intake-side command value INVVT*, which is a command value for the opening timing of the intake valve 16, based on the engine speed NE and the intake air amount Ga. An intake-side timing calculating section M38 calculates intake-side timing INVVT, which is the opening timing of the intake valve 16, based on the crank angle and the intake cam angle Cain. To perform feedback control to cause the intake-side timing INVVT to become the intake-side command value INVVT*, an intake VVT operating section M40 outputs an operation signal MS4 to the intake-side variable valve timing device 44 to operate the intake-side variable valve timing device 44.

An exhaust-side command value setting section M42 sets an exhaust-side command value EXVVT*, which is a command value for the opening timing of the exhaust valve 30, based on the engine speed NE and the intake air amount Ga. An exhaust-side timing calculating section M44 calculates exhaust-side timing EXVVT, which is the opening timing of the exhaust valve 30, based on the crank angle and the exhaust cam angle Caex. To perform feedback control to cause the exhaust-side timing EXVVT to become the exhaust-side command value EXVVT*, an exhaust VVT operating section M46 outputs an operation signal MS5 to the exhaust-side variable valve timing device 54 to operate the exhaust-side variable valve timing device 54.

Figure 3:
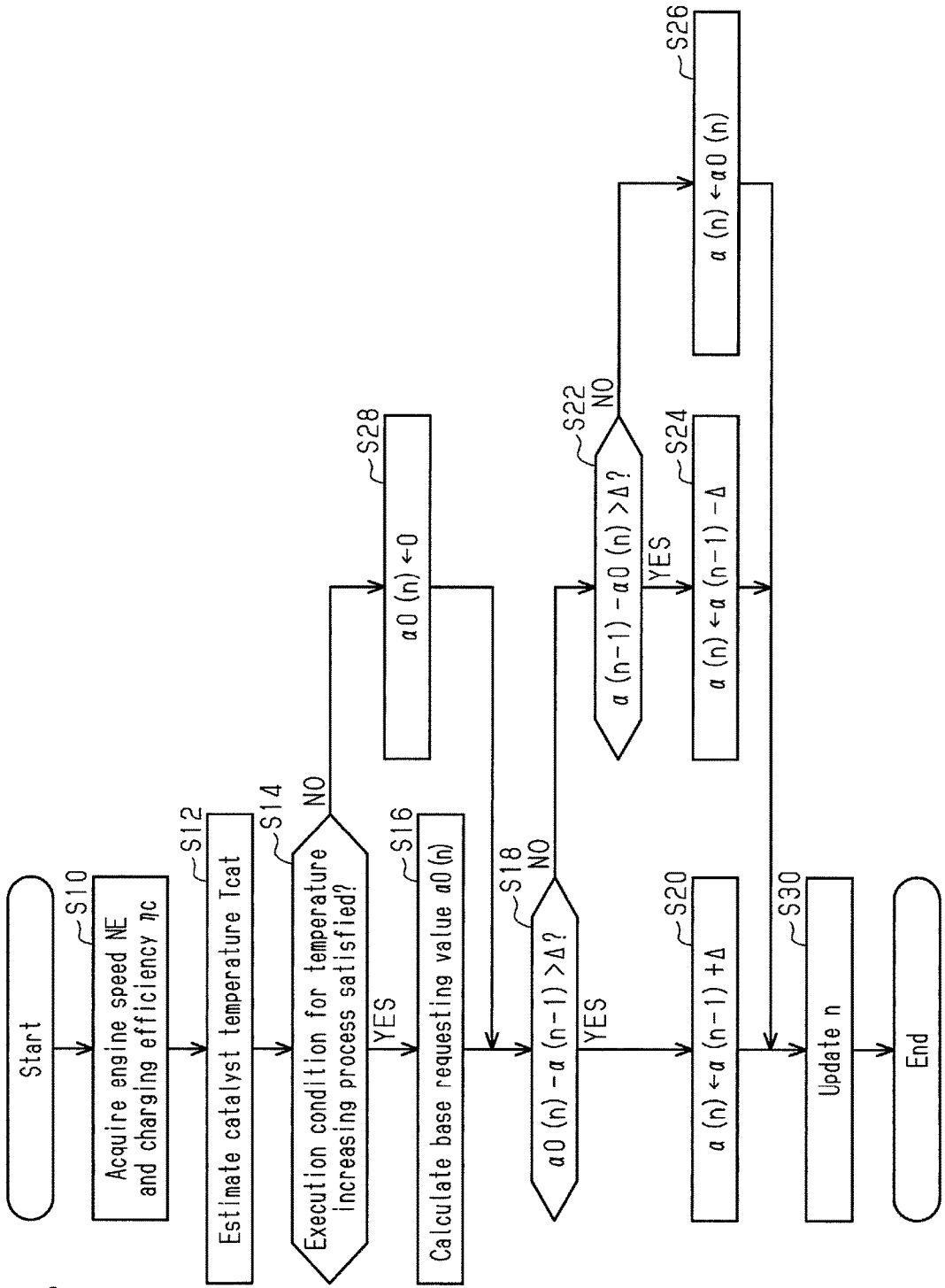
FIG. 3 is a flowchart showing the procedure of a process executed by a requesting value outputting section according to the embodiment.

FIG. 3 shows the procedure of the process executed by the requesting value outputting section M18. The process shown in FIG. 3 is performed by the CPU 72 repeatedly executing programs stored in the ROM 74 at a predetermined interval. In the following description, the number of each step is represented by the letter S followed by a numeral.

In the series of processes shown in FIG. 3, the CPU 72 first acquires the engine speed NE and a charging efficiency ηc (S10). The charging efficiency ηc is calculated by the CPU 72 based on the engine speed NE and the intake air amount Ga. Then, the CPU 72 estimates the temperature of the three-way catalyst 34 (catalyst temperature Tcat) based on the engine speed NE and the charging efficiency ηc (S12). When the charging efficiency ηc is high, the CPU 72 sets the catalyst temperature Tcat to a larger value than when the charging efficiency ηc is low. Specifically, the ROM 74 stores a two-dimensional map that defines the relationship between input variables, which are the engine speed NE and the charging efficiency ηc, and an output variable, which is the catalyst temperature Tcat. The catalyst temperature Tcat is calculated using the two-dimensional map. At this time, in order to cause the catalyst temperature Tcat, which is computed by the two-dimensional map, to change gradually, the CPU 72 may perform a filtering process on the value calculated with the two-dimensional map to obtain the final catalyst temperature Tcat. A map refers to a data set discrete values of input variables and values of output variables each corresponding to a value of the input variables. When the value of an input variable matches one of the values of input variable on the two-dimensional map, the map calculation uses the value of the corresponding output variable as the calculation result. When the value of the input variable does not match any of the values of the input variable of the two-dimensional map, the map calculation uses a value obtained by interpolation of multiple values of the output variable included in the data set as the calculation result.

Next, the CPU 72 determines whether an execution condition for a temperature increasing process for the three-way catalyst 34 (S14) is satisfied. The execution condition includes a condition that the temperature of the tip of the three-way catalyst 34 is higher than or equal to an activation starting temperature (for example 250° C.) and a condition that the catalyst temperature Tcat is not so high as to promote the reduction in the reliability of the three-way catalyst 34. The activation starting temperature is set, for example, to a temperature at which the conversion efficiency is 50%. The condition that the temperature of the tip of the three-way catalyst 34 is higher than or equal to the temperature at which the temperature of the three-way catalyst 34 becomes active (the activation starting temperature) is employed in consideration of the fact that the temperature increasing effect by the dither control decreases significantly when the temperature of the three-way catalyst 34 has not reached the activation starting temperature. Whether this condition is satisfied is determined, for example, based on whether the accumulated value of the intake air amount Ga from the start of the internal combustion engine 10 is larger than or equal to a predetermined value. In the present embodiment, the execution condition is set such that the dither control is executed as constantly as possible. The setting of this execution condition takes into consideration the characteristics of the three-way catalyst 34 according to the present embodiment. In a predetermined temperature range in which the catalyst temperature Tcat is higher than the activation starting temperature (for example, from 350° C. to 600° C.), the conversion efficiency of the three-way catalyst 34 for hydrocarbon, carbon monoxide, and nitrogen oxide (NOx) is higher when the temperature is high than when the temperature is low.

When determining that the execution condition is satisfied (S14: YES), the CPU 72 calculates a base requesting value α0, which is the base value of the correction requesting value α, based on the engine speed NE and the charging efficiency ηc (S16). The base requesting value α0 is set to the maximum in the medium load region. This setting is employed in consideration of the fact that, since the combustion is unstable in the low load region as compared with the medium load region, it is difficult to increase the base requesting value α0 in the low load region than in the medium load region, and that the exhaust temperature is high without executing the dither control in the high load region. Also, the base requesting value α0 is set to a larger value when the engine speed NE is high than when the engine speed NE is low. This is because the combustion is more stable when the engine speed NE is high than when the engine speed NE is low, so that the base requesting value α0 can be easily set to a large value. Specifically, the ROM 74 stores a two-dimensional map that defines the relationship between input variables, which are the engine speed NE and the charging efficiency ηc, and an output variable, which is the base requesting value α0. The CPU 72 calculates the base requesting value α0 using the two-dimensional map. In FIG. 3, the base requesting value is represented by α0($n$) using a variable n in the process of step S16. The variable n is used to designate specific data in the time-series data such as the base requesting value α0. In the following description, the data calculated in the current control cycle of the control cycles in the series of processes in FIG. 3 is defined as n, and the data that was calculated in the previous control cycle is defined as n−1.

Next, the CPU 72 determines whether the value obtained by subtracting the previous correction requesting value α(n−1) from the base requesting value α0($n$) calculated this time in the process of S16 is larger than a threshold value Δ (S18). When determining that the subtraction result is larger than the threshold value Δ (S18: YES), the CPU 72 adds the threshold value Δ to the previous correction requesting value α(n−1) and substitutes the resultant value for the amount correction requesting value α(n) (S20). In contrast, when determining that the subtraction result is less than or equal to the threshold value Δ (S18: NO), the CPU 72 subtracts the base requesting value α0($n$) calculated this time in the process of step S16 from the previous correction requesting value α(n−1) and determines whether the resultant value is larger than the threshold value Δ (S22). When determining that the subtraction result is larger than the threshold value Δ (S22: YES), the CPU 72 subtracts the threshold value Δ from the previous correction requesting value α(n−1) and substitutes the resultant value for the amount correction requesting value α(n) (S24). When determining that the subtraction result is less than or equal to the threshold value Δ (S22: NO), the CPU 72 substitutes the current base requesting value α0($n$) for the current correction requesting value α(n) (S26).

When determining that the execution condition is not satisfied (S14: NO), the CPU 72 sets the current base requesting value α0 ($n$) to zero (S28) and proceeds to the process of step S18.

When completing the processes of steps S20, S24, and S26, the CPU 72 updates the variable n (S30) and temporarily suspends the series of processes shown in FIG. 3.

Figure 4:
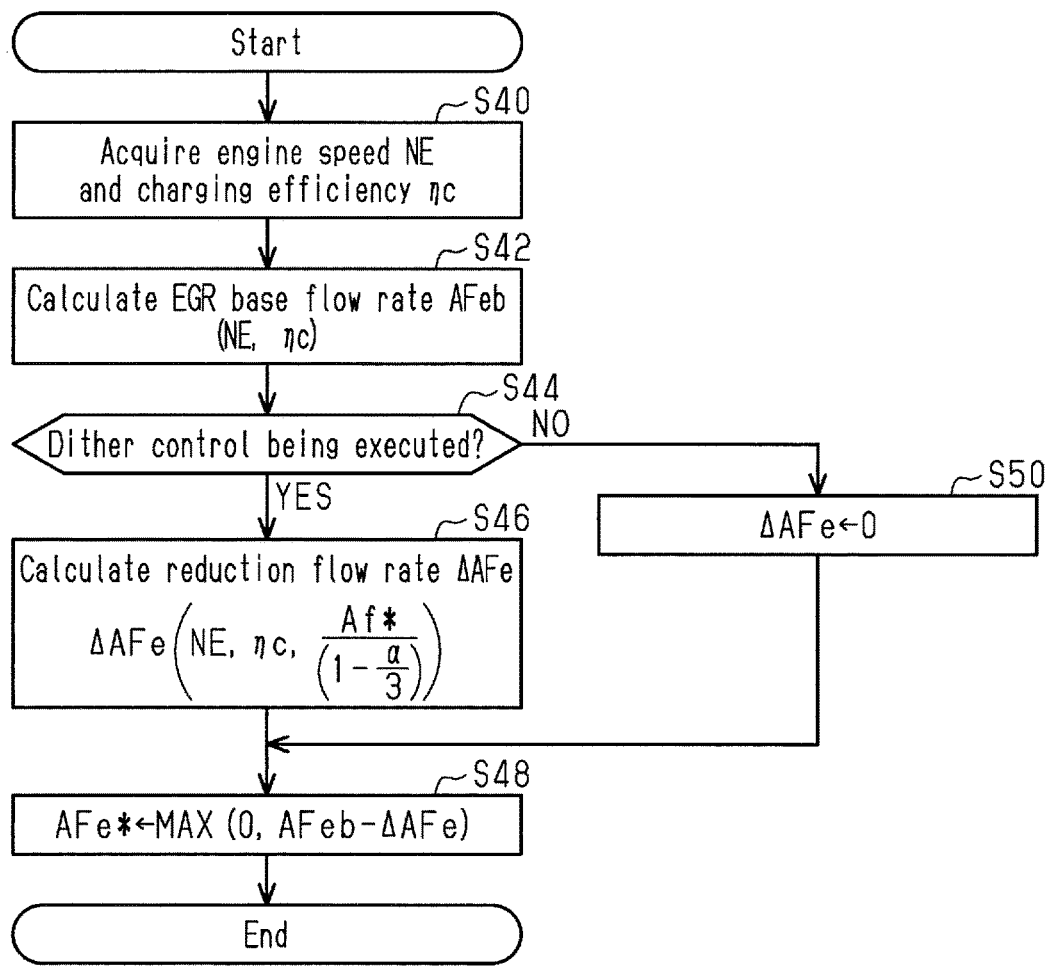
FIG. 4 is a flowchart showing the procedure of a process executed by an EGR flow rate setting section according to the embodiment.

FIG. 4 shows the procedure the process executed by the EGR flow rate setting section M32. The process shown in FIG. 4 is performed by the CPU 72 repeatedly executing programs stored in the ROM 74 at a predetermined interval.

In the series of processes shown in FIG. 4, the CPU 72 first acquires the engine speed NE and a charging efficiency ηc (S40). Then, the CPU 72 calculates an EGR base flow rate AFeb based on engine speed NE and the charging efficiency ηc. When the charging efficiency ηc is high, the EGR base flow rate AFeb is set to a larger value than when the charging efficiency ηc is low. When the engine speed NE is high, the EGR base flow rate AFeb is set to a larger value than when the engine speed NE is low. The EGR base flow rate AFeb is set as large as possible under the condition that the stability of combustion is within an allowable range. This is a setting for reducing the specific fuel consumption in consideration of the fact that there is a tendency that the specific fuel consumption of the internal combustion engine 10 tends to be reduced when the EGR rate is high rather than when the EGR rate is low. Specifically, in the present embodiment, the EGR rate is set to be highest in the medium load region. Specifically, the ROM 74 stores a two-dimensional map that defines the relationship between input variables, which are the engine speed NE and the charging efficiency ηc, and an output variable, which is the EGR base flow rate AFeb. The CPU 72 calculates the EGR base flow rate AFeb using the two-dimensional map. The EGR rate is the ratio of the EGR amount to the total amount of in-cylinder filling gas.

Next, the CPU 72 determines whether the dither control is being executed (S44). The CPU 72 determines that the dither control is being executed when the correction requesting value α is larger than zero. The process of S44 is configured to determine whether the dither control is likely to cause the combustion tol be out of the allowable range due to the EGR base flow rate AFeb set in the process of S42.

When determining that the dither control is being executed (S44: YES), the CPU 72 calculates a reduction flow rate ΔAFe, by which the EGR base flow rate AFeb will be reduced, based on the engine speed NE, the charging efficiency ηc, and a target air-fuel ratio Af*/{1−(α/3)} in the lean combustion cylinder (S 46). The engine speed NE and the charging efficiency ηc are parameters for obtaining the degree of stability of combustion when the dither control is not executed. The target air-fuel ratio in the lean combustion cylinder is a parameter for obtaining the degree of combustion stability in the lean combustion cylinder. The higher the target air-fuel ratio in the lean combustion cylinder, in other words, the larger the degree of leanness, the more unstable the combustion becomes. Taking this into consideration, even if the operating point of the internal combustion engine 10, which is defined by the engine speed NE and the charging efficiency ηc, is the same, the CPU 72 sets the reduction flow rate ΔAFe to a larger value when the degree of leanness is large than when it is small. Thus, in a case in which the operating point that determines the EGR base flow rate AFeb is the same, the EGR rate is set to a smaller value when the degree of leanness is large than when the degree is small. Specifically, the ROM 74 stores a three-dimensional map that defines the relationship between input variables, which are the engine speed NE, the charging efficiency ηc, and the target air-fuel ratio in the lean combustion cylinder, and an output variable, which is the reduction flow rate ΔAFe. The CPU 72 calculates the reduction flow rate ΔAFe using the three-dimensional map.

The CPU 72 sets the EGR flow rate command value AFe* to the larger one of the value obtained by subtracting the reduction flow rate ΔAFe from the EGR base flow rate AFeb and zero (S48). On the other hand, when determining that the dither control is not being executed (S44: NO), the CPU 72 sets the reduction flow rate ΔAFe to zero (S50) and proceeds to the process of S48.

When the process of step S48 is completed, the CPU 72 temporarily ends the series of processes shown in FIG. 4.

The operation of the present embodiment will now be described.

Figure 5:
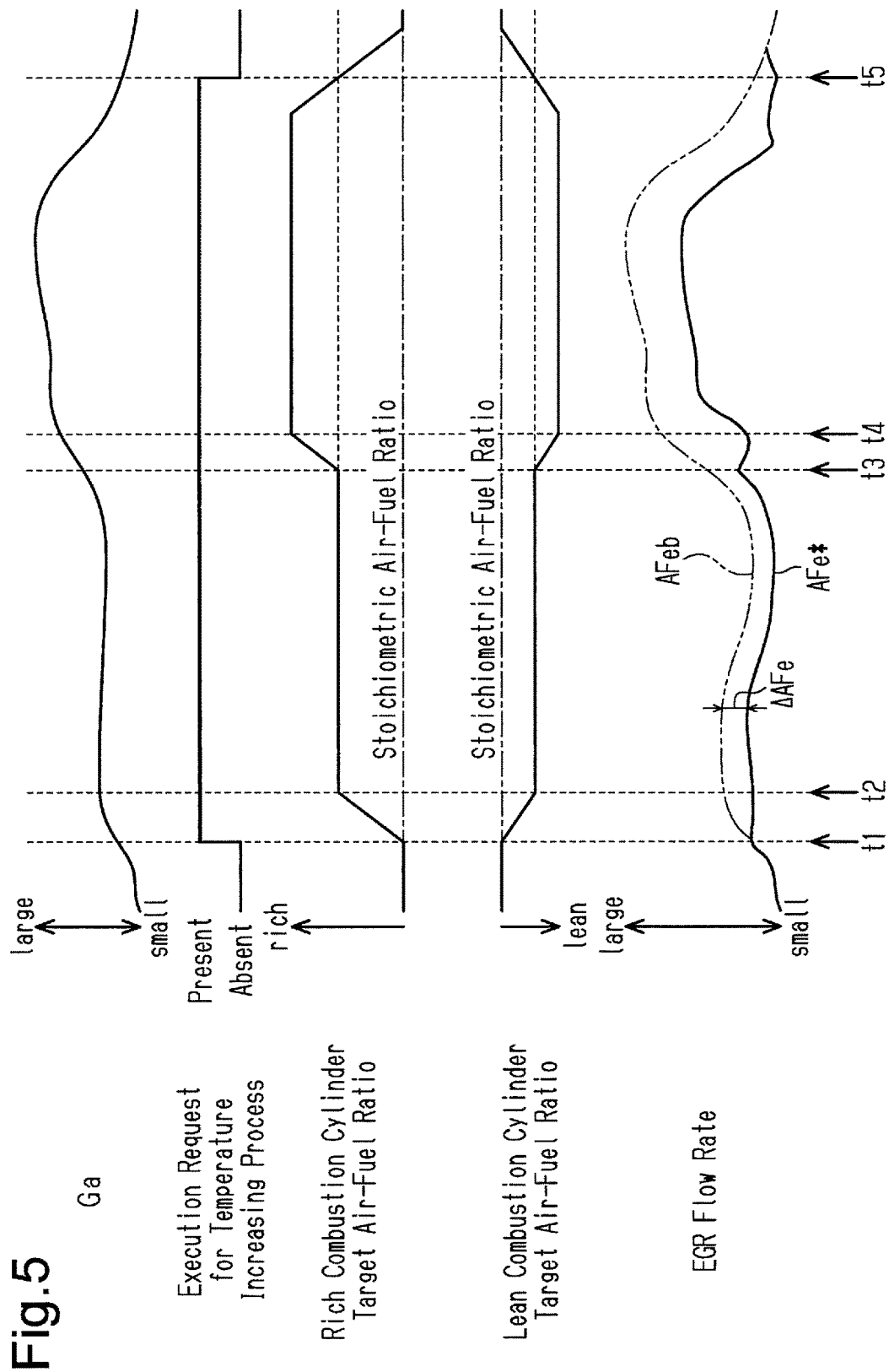
FIG. 5 is a timing diagram showing an example of movements of values in dither control according to the embodiment.

FIG. 5 shows movements of the intake air amount Ga, the presence or absence of a request for execution of the temperature increasing process, the target air-fuel ratio AF*/(1+α) in the rich combustion cylinder, the target air-fuel ratio in the lean combustion cylinder, and the EGR flow rate.

As shown in FIG. 5, when the dither control is started at a point in time t1, the air-fuel ratio in the rich combustion cylinder gradually becomes rich while the air-fuel ratio in the lean combustion cylinder gradually becomes lean. This is the result of the gradual change process from S18 to S26 in FIG. 3. A point in time t2 is the time at which the correction requesting value α matches the base requesting value α0.

When the dither control is executed, the EGR base flow rate AFeb is reduced to obtain the EGR flow rate command value AFe*. Moreover, the reduction flow rate ΔAFe increases as the target air-fuel ratio in the lean combustion cylinder increases. FIG. 5 shows an example in which the base requesting value α0 is increased at a point in time t 3, and the reduction flow rate ΔAFe is increased, accordingly. A point in time t4 represents the time at which the correction requesting value α matches the base requesting value α0 again.

When the request for execution of the temperature increasing process disappears at a point in time t5, the variable n of the base requesting value α0 becomes zero. However, the gradual change process from S18 to S26 in FIG. 3 causes the correction requesting value α to gradually become zero. Therefore, the target air-fuel ratio in the rich combustion cylinder and the target air-fuel ratio in the lean combustion cylinder gradually shift to the stoichiometric air-fuel ratio, which is the target value Af*. As the target air-fuel ratio of the lean burn cylinder gradually shifts to the stoichiometric air-fuel ratio, the reduction flow rate ΔAFe gradually decreases according to the process of S46 in FIG. 4. Then, when the reduction flow rate ΔAFe becomes zero, the EGR flow rate command value AFe* matches the EGR base flow rate AFeb.

Thus, with the present embodiment, when executing the dither control, the EGR flow rate command value AFe* is reduced as compared with the case where the dither control is not executed. The present embodiment thus limits deterioration of the temperature increasing performance of the dither control while reducing destabilization of combustion. In order to reduce destabilization of combustion, the correction requesting value α may be limited in accordance with the EGR rate. This configuration, however, would reduce the temperature increasing performance.

The present embodiment described above further achieves the following advantages.

(1) The reduction flow rate ΔAFe is set to a larger value when the degree of leanness, which indicates how lean the target air-fuel ratio in the lean combustion cylinder is relative to the stoichiometric air-fuel ratio, is large than it is small. Thus, in consideration of the fact that the combustion becomes more unstable when the degree of leanness in the lean combustion cylinder is large than when the leanness is small, it is possible to reduce destabilization of combustion due to the large EGR rate. That is, the reduction in the reduction flow rate ΔAFe reduces destabilization of combustion while limiting deterioration of the temperature increasing performance of the dither control.

(2) A process configured to limit the rate of change of the correction requesting value α is executed. In other words, the process configured to limit the rate of change of the degree of leanness in the lean combustion cylinder is executed. This restricts abrupt changes in the combustion state. Further, the above limiting process is executed together with the process configured to set the reduction flow rate ΔAFe a larger value when the degree of leanness, which indicates how lean the target air-fuel ratio in the lean combustion cylinder is relative to the stoichiometric air-fuel ratio, is large than when it is small. This restricts abrupt changes in the EGR rate.

Second Embodiment

A second embodiment will now be described with reference to the drawings. The differences from the first embodiment will mainly be discussed.

Figure 6:
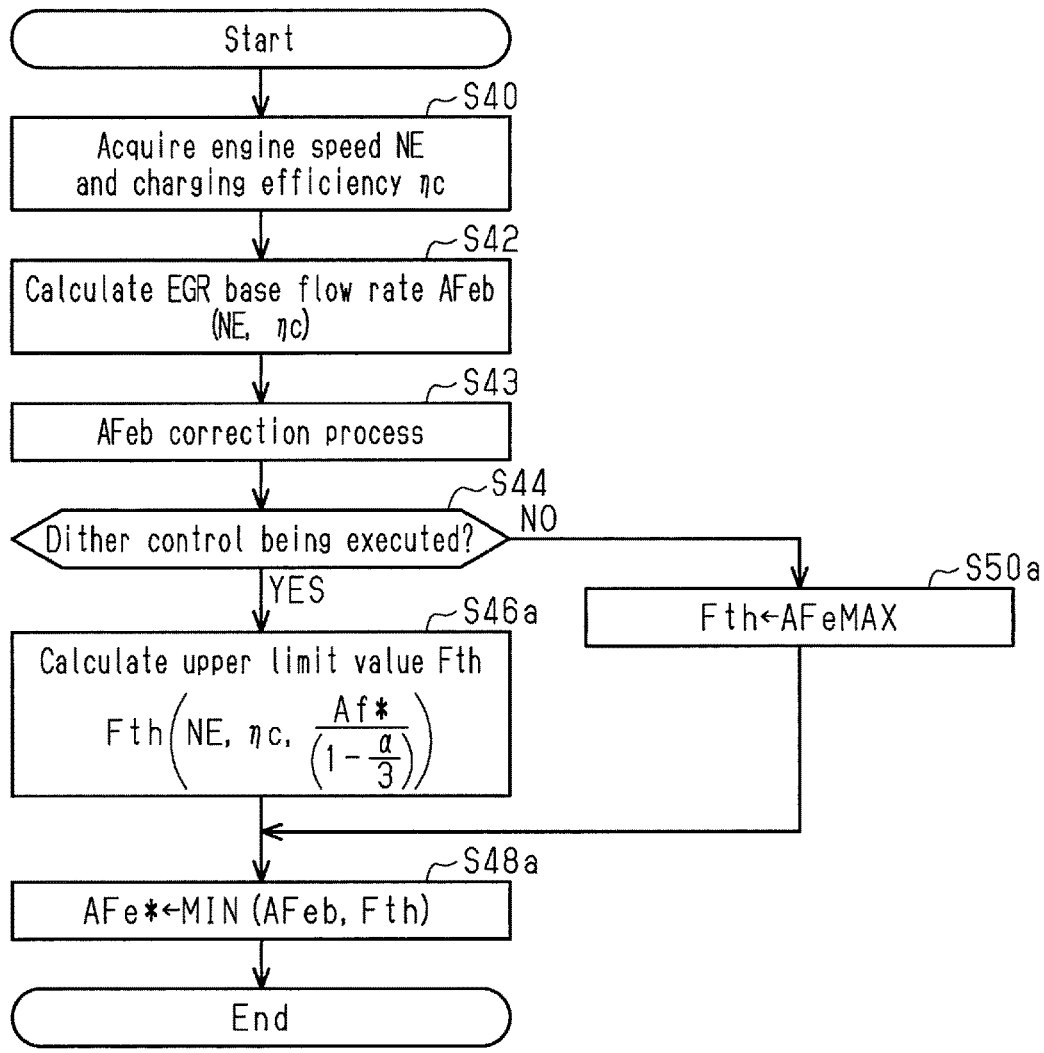
FIG. 6 is a flowchart showing the procedure of a process executed by an EGR flow rate setting section according to a second embodiment.

FIG. 6 shows the procedure of the process executed by the EGR flow rate setting section M32. The process shown in FIG. 6 is performed by the CPU 72 repeatedly executing programs stored in the ROM 74 at a predetermined interval. In FIG. 6, the process corresponding to the process shown in FIG. 4 is given the same step number for the illustrative purposes and the explanation is omitted.

In the series of processes shown in FIG. 6, when the process of S42 is completed, the CPU 72 executes a process configured to correct the EGR base flow rate AFeb (S43). When the coolant temperature THW is low, the EGR base flow rate AFeb is set to zero, and when the coolant temperature THW increases, the EGR base flow rate AFeb converges to a value calculated in S42. Upon completion of the process of S43, the CPU 72 proceeds to the process of S44.

When determining that the dither control is being executed (S44: YES), the CPU 72 calculates an upper limit value Fth of the EGR flow rate command value AFe* based on the engine speed NE, the charging efficiency ηc, and the air-fuel ratio in the lean combustion cylinder (S46a). The intent of using the engine speed NE, the charging efficiency ηc, and the air-fuel ratio in the lean combustion cylinder respectively is the same as the process of S46. Specifically, the larger the degree of leanness in the lean combustion cylinder, the more unstable the combustion becomes. Taking this into consideration, even if the operating point of the internal combustion engine 10, which is defined by the engine speed NE and the charging efficiency ηc, is the same, the CPU 72 sets the upper limit value Fth to a smaller value when the degree of leanness is large than when it is small. Thus, in a case in which the operating point that determines the EGR base flow rate AFeb is the same, the EGR rate is limited to a smaller value when the degree of leanness is large than when the degree is small.

In contrast, when determining that the dither control is not being executed (S44: NO), the CPU 72 sets the upper limit value Fth to a maximum value AFeMAX (S50a). The maximum value AFeMAX is set to a value larger than the maximum value that the EGR base flow rate AFeb can take. When the processes of S46a and S50a are completed, the CPU 72 substitutes the smaller one of the EGR base flow rate AFeb and the upper limit value Fth for the EGR flow rate command value AFe* (S48a).

When the process of step S48a is completed, the CPU 72 temporarily suspends the series of processes shown in FIG. 6.

The operation of the present embodiment will now be described.

Based on the operating point of the internal combustion engine 10, which is determined by the engine speed NE and the charging efficiency ηc, the CPU 72 calculates the EGR base flow rate AFeb and then corrects the calculated value based on the coolant temperature THW. Thus, even at the same operating point, the EGR base flow rate AFeb can take various values according to the coolant temperature THW. Therefore, when the target air-fuel ratio in the lean combustion cylinder in the dither control is a predetermined air-fuel ratio, the stability of combustion may or may not be ensured by the EGR base flow rate AFeb corrected in the process of S43.

Accordingly, the CPU 72 varies the upper limit value Fth in an upper limit guard process for the EGR base flow rate AFeb in accordance with the target air-fuel ratio in the lean combustion cylinder. Thus, in a state in which the dither control is being executed despite the fact that the EGR base flow rate AFeb, which has been corrected in the process of S43, is a value that ensures the combustion stability, the EGR base flow rate AFeb is prevented from being reduced due to the execution of the dither control.

Third Embodiment

A third embodiment will now be described with reference to the drawings. The differences from the first embodiment will mainly be discussed.

In the present embodiment, the EGR passage 60 and the EGR valve actuator 62 are omitted. In the processes shown in FIG. 2, the programs related to the process of the EGR flow rate setting section M32 and the opening degree operating section M34 are not stored in the ROM 74. Instead, in the present embodiment, the internal EGR amount is adjusted by the overlap amount OV between the valve opening period of the intake valve 16 and the valve opening period of the exhaust valve 30.

Figure 7:
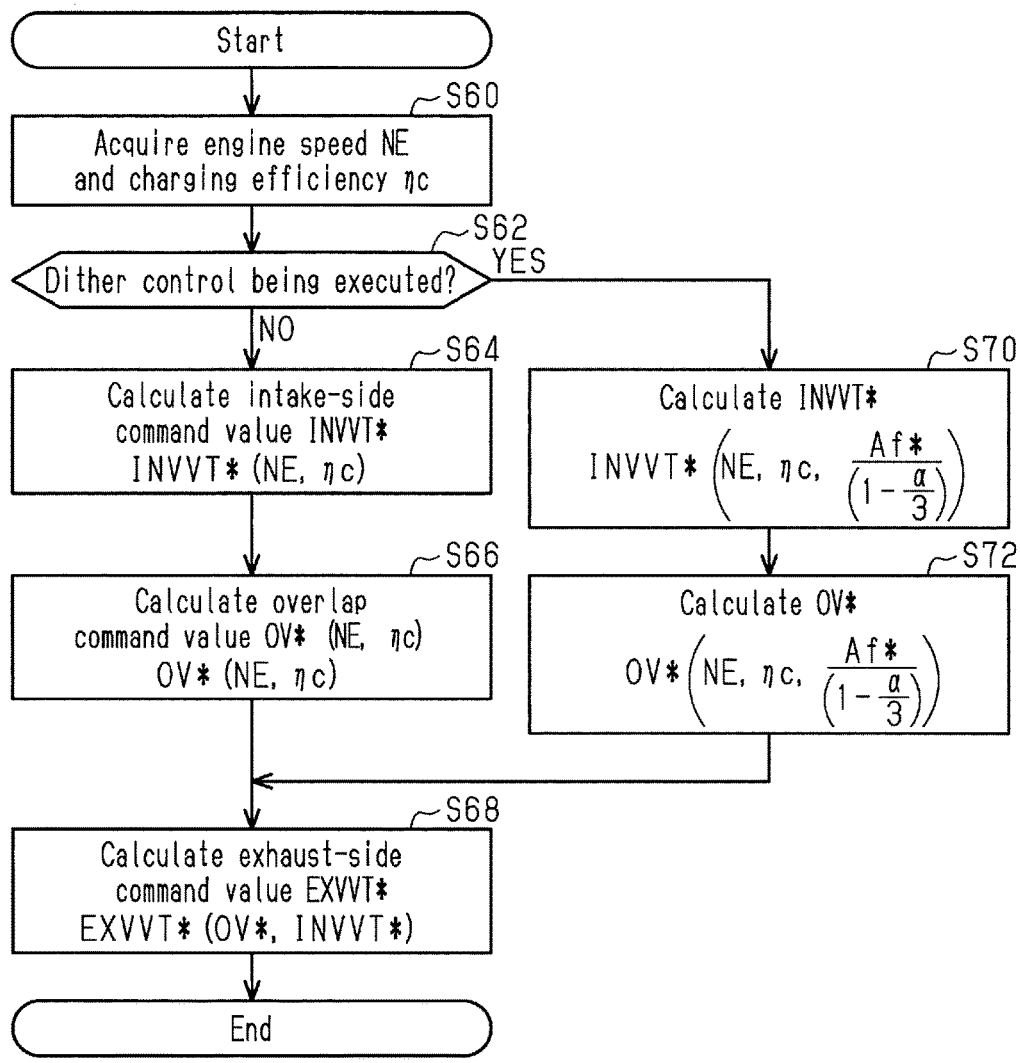
FIG. 7 is a flowchart showing the procedure of a process configured to set a valve timing command value according to a third embodiment.

FIG. 7 shows the procedure of the process executed by the intake-side command value setting section M36 and the exhaust-side command value setting section M42. The process shown in FIG. 7 is implemented by the CPU 72 executing programs stored in the ROM 74.

In the series of processes shown in FIG. 7, the CPU 72 first acquires the engine speed NE and a charging efficiency ηc (S60). Then, the CPU 72 determines whether the dither control is being executed in the same manner as the process of S44 (S62). When determining that the dither control is not being executed (S62: NO), the CPU 72 calculates the intake-side command value INVVT* based on the engine speed NE and the charging efficiency ηc (S 64). For example, when the charging efficiency ηc is large, the CPU 72 sets the intake-side command value INVVT* to a more advanced value than when it is small. Specifically, the ROM 74 stores a two-dimensional map that defines the relationship between input variables, which are the engine speed NE and the charging efficiency ηc, and an output variable, which is the intake-side command value INVVT*. The CPU 72 calculates the intake-side command value INVVT* using the two-dimensional map.

Next, the CPU 72 calculates an overlap command value OV*, which is a command value for the overlap amount OV based on the engine speed NE and the charging efficiency ηc (S66). Specifically, the ROM 74 stores a two-dimensional map that defines the relationship between input variables, which are the engine speed NE and the charging efficiency ηc, and an output variable, which is the overlap command value OV*. The CPU 72 calculates the overlap command value OV* using the two-dimensional map. Then, the CPU 72 calculates the exhaust-side command value EXVVT* based on the overlap command value OV* and the intake-side command value INVVT* (S68).

When determining that the dither control is being executed (S62: YES), the CPU 72 calculates the intake-side command value INVVT* based on the engine speed NE, the charging efficiency ηc, and the air-fuel ratio in the lean combustion cylinder (S70). The intent of using the engine speed NE, the charging efficiency ηc, and the air-fuel ratio in the lean combustion cylinder respectively is the same as the process of S46. Specifically, when the operating point of the internal combustion engine 10, which is defined by the engine speed NE and the charging efficiency ηc, is the same, the CPU 72 sets the intake-side command value INVVT* to a more delayed value than in the process of S64. Even if the operating point of the internal combustion engine 10, which is defined by the engine speed NE and the charging efficiency ηc, is the same, the CPU 72 sets the intake-side command value INVVT* to a more delayed value when the degree of leanness is large than when the degree of leanness is small. Specifically, the ROM 74 stores a two-dimensional map that defines the relationship between input variables, which are the engine speed NE, the charging efficiency ηc, and the target air-fuel ratio in the lean combustion cylinder, and an output variable, which is the intake-side command value INVVT*. The CPU 72 calculates the intake-side command value INVVT* using the two-dimensional map.

Next, the CPU 72 calculates the overlap command value OV* based on the charging efficiency ηc and the air-fuel ratio in the lean combustion cylinder (S72). The intent of using the engine speed NE, the charging efficiency ηc, and the air-fuel ratio in the lean combustion cylinder respectively is the same as the process of S46. Specifically, when the operating point of the internal combustion engine 10, which is defined by the engine speed NE and the charging efficiency ηc, is the same, the CPU 72 sets the overlap command value OV* to a smaller value than in the process of S66. Even if the operating point of the internal combustion engine 10, which is defined by the engine speed NE and the charging efficiency ηc, is the same, the CPU 72 sets the overlap command value OV* to a smaller value when the degree of leanness is large than when the degree of leanness is small. Thus, in a case in which the operating point is the same, the EGR rate is set to a smaller value when the degree of leanness is large than when the degree is small. Specifically, the ROM 74 stores a two-dimensional map that defines the relationship between input variables, which are the engine speed NE, the charging efficiency ηc, and the target air-fuel ratio in the lean combustion cylinder, and an output variable, which is the overlap command value OV*. The CPU 72 calculates the overlap command value OV* using the two-dimensional map.

Upon completion of the process of S72, the CPU 72 proceeds to the process of S68. Also, when step S68 is completed, the CPU 72 temporarily suspends the series of processes shown in FIG. 7.

The operation of the present embodiment will now be described.

FIG. 8 shows movements of the intake air amount Ga, the presence or absence of a request for execution of the temperature increasing process, the target air-fuel ratio in the rich combustion cylinder, and the overlap command value OV*. In FIG. 8, the overlap command value OV* of the present embodiment is represented by a solid line, and the overlap command value OV* when assuming that the dither control is not executed is represented by a broken line. The points in time t1 to t5 in FIG. 8 respectively correspond to the points in time t1 to t5 shown in FIG. 5.

As shown in FIG. 8, when executing the dither control, the CPU 72 reduces the overlap command value OV* as compared with the case of not executing the dither control. Thus, the amount of the internal EGR decreases, and the EGR rate decreases, accordingly. For this reason, the overlap command value OV*, which is determined in the process of S66, reduces the EGR rate and reduces destabilization of combustion when there is a possibility that the combustion will be destabilized due to the dither control.

The above-described present embodiment achieves the following advantage in addition to the advantages similar to the advantages (1) and (2) described above.

(3) When reducing the overlap command value OV* in the process of S72, the CPU 72 delays the intake-side command value INVVT* in the process of S70. This allows the opening timing of the intake valve 16 to be delayed and the opening timing of the exhaust valve 30 to be advanced simultaneously. For this reason, as compared with the case where only one of these is executed, it is possible to minimize the deviation from the opening timing of the intake valve 16, which is determined in the process of S64, and deviation from the opening timing of the exhaust valve 30, which is determined in the processes of S66, S68.

<Correspondence>

The correspondence between the items in the above embodiments and the items described in the above SUMMARY is as follows. Below, the correspondence is shown for each of the numbers in the examples described in the above SUMMARY.

[1] The adjustment actuator corresponds to the EGR valve actuator 62 in the first and second embodiments. The adjustment actuator corresponds to the intake-side variable valve timing device 44 and the exhaust-side variable valve timing device 54 in the third embodiment. The catalyst corresponds to the three-way catalyst 34. The dither control process corresponds to the processes of the requesting value outputting section M18, the correction coefficient calculating section M20, the dither correcting section M22, the multiplication section M24, the correction coefficient calculating section M26, the dither correcting section M28, and the injection amount operating section M30. The EGR control process corresponds to the processes of the EGR flow rate setting section M32 and the opening degree operating section M34 in the first and second embodiments. In the third embodiment, the EGR control process corresponds to the processes of intake-side command value setting section M36, the intake VVT operating section M40, the exhaust-side command value setting section M42, and the exhaust VVT operating section M46.

[2] Example 2 corresponds to the processes of steps S46, S46a, and S72.

[3] The base setting process corresponds to the process of step S42, and the guard value setting process corresponds to the process of step S46a.

[4] Example 4 corresponds to the first and second embodiments.

[5] Example 5 corresponds to the third embodiment.

Other Embodiments

At least one feature of the above-illustrated embodiments may be modified as follows.

Regarding Execution Condition for Dither Control

The execution condition for the temperature increasing process, which is the execution condition for the dither control, is not limited to those in the above embodiments. For example, the execution condition may include a condition that the purge concentration is lower than or equal to a predetermined concentration. The execution condition may include, for example, a condition that a request to warm up the three-way catalyst 34 is made and a condition that the execution condition of the S release process of the three-way catalyst 34 is satisfied. Also, two three-way catalysts may be respectively provided in the upstream and downstream sections of the exhaust passage 32. In this case, the execution condition may include a case in which a request to warm up the upstream three-way catalyst is made, a case in which a request to warm up the downstream three-way catalyst is made, a case in which an execution condition for the S release process for the upstream three-way catalyst is satisfied, and a case in which the execution condition for the S release process for the downstream three-way catalyst is satisfied. In the case of increasing the temperature of the downstream three-way catalyst, a process configured to increase the exhaust temperature with the upstream three-way catalyst is executed by the dither control.

The aim of executing the dither control as constantly as possible as in the above embodiments is not limited to the one described above. For example, in the case of a three-way catalyst in which the conversion efficiency of nitrous oxide is high in a region where the temperature is sufficiently higher than the activation starting temperature, performing the dither control as constantly as possible is effective in increasing the conversion efficiency of nitrous oxide.

Regarding Dither Control Process

The base requesting value $\alpha 0$ may be varied based on not only the engine speed NE and charging efficiency $\eta c$, but also the coolant temperature THW. For example, the base requesting value $\alpha 0$ may be varied based on a set of only two parameters. Such a set of two parameters may be a set of the engine speed NE and coolant temperature THW or a set of the charging efficiency $\eta c$ and the coolant temperature THW. For example, the base requesting value $\alpha 0$ may be varied based on only one of the above three parameters. In the above-illustrated embodiment, the engine speed NE and the charging efficiency $\eta c$ are used as parameters for determining the operating point of the internal combustion engine 10. For example, instead of the charging efficiency $\eta c$, which is a load, the accelerator operation amount may be used as a load. Also, instead of the engine speed NE and the load, the base requesting value $\alpha 0$ may be varied based on the intake air amount Ga.

It is not essential to vary the base requesting value $\alpha 0$ based on the above parameters. For example, the base requesting value $\alpha 0$ may be a fixed value. Even in this case, if the EGR rate is lowered when the dither control process is being executed as compared with that when the dither control process is not being executed, it is possible to limit deterioration of the temperature increasing performance of the dither control while reducing destabilization of combustion.

The dither control process is not limited to setting the correction amount of the injection amount. For example, a base injection amount calculating section M12 may be provided for each of the rich combustion cylinder and the lean combustion cylinder. In this case, the base injection amount calculating section M12 for the rich combustion cylinder calculates the base injection amount Qb as the open loop operation amount for achieving a rich target air-fuel ratio. The base injection amount calculating section M12 for the lean combustion cylinder calculates the base injection amount Qb as the open loop operation amount for achieving a lean target air-fuel ratio. At this time, the mean value of the air-fuel ratios of the air-fuel mixture in the combustion chambers 22 the cylinders may be set to the target value Af*. In this case, the mean value of the exhaust air-fuel ratios may deviate from the target value of the exhaust air-fuel ratio when all the cylinders have the same air-fuel ratio. This deviation can be compensated by air-fuel ratio feedback control.

The exhaust air-fuel ratio of the target exhaust gas is defined by using a hypothetical air-fuel mixture. The hypothetical air-fuel mixture is defined as a mixture of only fresh air and fuel that is composed such that, when burned, the resultant exhaust gas has an unburned fuel concentration (for example, HC), an incomplete combustion component concentration (for example, CO), and an oxygen concentration that are the same as those of the target exhaust gas. The exhaust air-fuel ratio is defined as the air-fuel ratio of the hypothetical air-fuel mixture. The combustion of the hypothetical air-fuel mixture is not limited to combustion in which at least one of the oxygen concentration and the concentration of the unburned fuel and the incomplete combustion component is zero or can be regarded as zero, but also includes combustion in which the oxygen concentration and the concentration of the unburned fuel and the incomplete combustion component are both larger than zero. The target value of the exhaust air-fuel ratio is the exhaust air-fuel ratio that occurs when the air-fuel ratio of the air-fuel mixture of all the cylinders is the target value Af*.

In the above-described embodiments, the lean combustion cylinder and the rich combustion cylinder are specific cylinders, but the disclosure is not limited thereto. For example, at every combustion cycle, the second and third cylinders in the order of the piston reaching the compression top dead center may alternately be used as the rich combustion cylinder. Within one combustion cycle, the mean value of the exhaust air-fuel ratio and the mean value of the air-fuel ratios of the air-fuel mixture in the cylinders do not necessarily need to be the target values. For example, in the case of a four-cylinder engine as in the above embodiment, the mean value of the exhaust air-fuel ratio and the mean value of the air-fuel ratio of the air-fuel mixture in each cylinder for five strokes may be used as the target values. It is desirable that a period in which both the rich combustion cylinder and the lean combustion cylinder exist in a single combustion cycle occur at least once in two combustion cycles.

Regarding Guard Process by Dither Control

In FIG. 6, the EGR base flow rate AFeb is set as the base parameter to be subjected to the guard process, but the base parameter is not limited to this. For example, the base parameter may be set to a base value of the EGR rate. In this case, since the value subjected to the guard process also becomes the EGR rate, the CPU 72 only needs to operate the EGR valve actuator 62 so as to open to a degree corresponding to the EGR rate. Further, the opening degree of the EGR valve actuator 62 may be used as the base parameter.

In the third embodiment, the guard value of the overlap amount may be set by the dither control. In this case, when setting the intake-side command value INVVT* based on the overlap command value OV* after the guard process, it is possible to reduce the deviation of the center of the overlap period with respect to the case where the dither control is not executed. In addition, when the adjustment actuator is configured only by the intake-side variable valve timing device 44 as described in the section Regarding Adjustment Actuator below, the upper limit guard value of the advanced amount may be set by the dither control.

Regarding EGR Control Process

The operating point of the internal combustion engine 10, which is an input parameter for setting the EGR rate by the EGR control processing, is not limited to the one that determined by the engine speed NE and the charging efficiency ηc. For example, instead of the charging efficiency ηc, an accelerator operation amount may be used as a parameter relating to the load. For example, instead of the engine speed NE and the load, the intake air amount Ga may be used as an input parameter.

Further, the input parameter for obtaining the degree of leanness in the lean combustion cylinder in the dither control is not limited to the target air-fuel ratio in the lean combustion cylinder, but may be, for example, the correction requesting value α. For example, if the mean value of the exhaust air-fuel ratio and the mean value of the air-fuel ratio of the air-fuel mixture of each cylinder are controlled to become the target values, the degree of richness in the rich combustion cylinder will have a one-to-one correspondence with the degree of leanness in the lean combustion cylinder. Thus, the degree of richness in the rich combustion cylinder may be used as an input parameter.

Regarding Setting Relationship between Dither Control and EGR Control

In the second embodiment described above, the process of step S43 exemplifies a process in which the EGR rate (EGR base flow rate AFeb) when the correction requesting value α by the dither control is the predetermined value can be various values. The process of step S43 is not limited to this. For example, when the coolant temperature THW is lower than or equal to a predetermined temperature, the EGR control may be stopped so that the calculation of the EGR base flow rate AFeb is not executed. In this case, if the coolant temperature THW exceeds the predetermined temperature, it is only necessary to start the EGR control so that the EGR base flow rate AFeb is gradually brought closer to the value calculated in the process of S42 as the coolant temperature THW increases. For example, instead of omitting the process of S43 in the process of FIG. 6, an upper limit value Fth2 may be calculated that is set to a smaller value when the coolant temperature THW is low than when the coolant temperature THW is high. In the process of S48a, the minimum value of the EGR base flow rate AFeb and the upper limit values Fth, Fth2 may be substituted for the EGR flow rate command value AFe*.

The EGR rate is not unambiguously determined depending on the parameter defining the base requesting value α0. The cause of this is execution of the EGR control in accordance with the coolant temperature THW in the above-described embodiments. However, the present disclosure is not limited to this. For example, in an internal combustion engine equipped with a forced-induction device, the cause may be the execution of a process configured to temporarily limit the opening degree of the EGR valve actuator 62 in order to increase the forced-induction pressure.

The cause of the EGR rate not being unambiguously determined depending on the parameter defining the base requesting value α0 is not limited to ones described above. For example, the cause may be difference between parameter for setting the base requesting value α0 and the parameter for setting the EGR base flow rate AFeb. Alternatively, the cause may be difference between the parameter for setting the base requesting value α0 and the parameter for setting the overlap command value OV*.

The process setting with which the EGR rate, which is reduced or restricted by the dither control, is not unambiguously determined in relation to the degree of leanness in the dither control is not limited to the process setting with which the EGR rate is not unambiguously determined depending on the parameter defining the base requesting value α0. This is exemplified by the gradual change process of S18 to S26. In any case, when the process setting is configured that prevents the target EGR rate from being unambiguously determined in relation to the degree of leanness in the dither control, it is effective to perform the guard process for the target EGR rate in accordance with the degree of leanness in the lean combustion cylinder of dither control as in the second embodiment described above.

Regarding Adjustment Actuator

In the third embodiment, the intake-side variable valve timing device 44 and the exhaust-side variable valve timing device 54 constitute the adjustment actuator, but the present disclosure is not limited to this. For example, only the intake-side variable valve timing device 44 may constitute the adjustment actuator. In this case, the overlap amount OV is unambiguously determined by the advanced amount of the intake-side timing INVVT.

In the third embodiment described above, an actuator is used that shifts the opening timing and closing timing of the valves while fixing the cam profiles of the intake cam 42 and the exhaust cam 52. The present disclosure is not limited this. For example, a actuator that changes the valve lift amount may be used to change the overlap amount, thereby adjusting the internal EGR amount.

Furthermore, the EGR control is not limited to controlling of only either the internal EGR amount or the external EGR amount, but the EGR control may be controlling of both the internal EGR amount and the external EGR amount. In this case, the EGR rate achieved by both the internal EGR amount and the external EGR amount only needs to be set such that the instability of combustion remains within the allowable range even when the dither control is executed.

Regarding Controller

The controller 70 is not limited to a device that includes the CPU 72 and the ROM 74 and executes software processing. For example, at least part of the processes performed by software in the above-illustrated embodiments may be performed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Catalyst

The catalyst is not limited to the three-way catalyst 34. For example, a gasoline particulate filter (GPF) with a three-way catalyst may be used. That is, any type of catalyst can be used as long as it makes a temperature increase request and the temperature of the catalyst can be increased by using oxidation heat generated when unburned fuel components and incomplete combustion components in the exhaust gas discharged from the rich combustion cylinder are oxidized by oxygen in the exhaust gas discharged from the lean combustion cylinder.

Regarding Internal Combustion Engine

The internal combustion engine is not limited to a four-cylinder engine. For example, an in-line six-cylinder engine may be used. Alternatively, a V engine may be used, which includes a first catalyst and a second catalyst that purifies exhaust gas from different cylinders.

Other

The fuel injection valve is not limited to one that injects fuel into the combustion chamber 22, but may be one that injects fuel, for example, into the intake passage 12. The air-fuel ratio feedback control does not necessarily need to be executed when the dither control is executed. Instead of estimating the temperature of the three-way catalyst 34, a sensor that detects this may be provided and the detection value of the sensor may be used.

The invention claimed is:

1. A controller configured to control an internal combustion engine including a catalyst that purifies exhaust gas discharged from a plurality of cylinders and an adjustment actuator that adjusts an exhaust gas recirculation (EGR) rate, wherein the cylinders include at least one lean combustion cylinder and at least one rich combustion cylinder, which is different from the lean cylinder, the controller is configured to execute:
   a dither control process, in which, when a request to increase a temperature of the catalyst is made, the controller controls fuel injection valves corresponding to the respective cylinders such that an air-fuel ratio in the lean combustion cylinder is controlled to become leaner than a stoichiometric air-fuel ratio and that an air-fuel ratio in the rich combustion cylinder is controlled to become richer than the stoichiometric air-fuel ratio; and
   an EGR control process, in which the controller operates the adjustment actuator to control the EGR rate,
   wherein the EGR control process includes operating the adjustment actuator such that the EGR rate is lower when the dither control process is being executed than when the dither control process is not being executed,
   wherein the dither control process includes a process configured to vary a degree of leanness in the lean combustion cylinder, and
   wherein the EGR control process includes
      operating the adjustment actuator such that the EGR rate is smaller when the degree of leanness in the lean combustion cylinder achieved by the dither control process is large than when the degree of leanness is small,
      a base setting process configured to set a base parameter, which is a parameter for setting an operation amount of the adjustment actuator, based on an operating point of the internal combustion engine, and
      a guard value setting process configured to set a guard value for the base parameter such that, when the dither control process is being executed, the EGR rate is limited to a smaller value when the degree of leanness in the lean combustion cylinder is large than when the degree of leanness is small, and
   wherein the EGR control process is a process configured to operate the adjustment actuator based on a value obtained by subjecting the base parameter to a guard process with the guard value.

2. The controller for an internal combustion engine according to claim 1, wherein
   the internal combustion engine includes
      an EGR passage, which connects an exhaust passage and an intake passage with each other, and
      an EGR valve actuator, which adjusts a flow cross-sectional area of the EGR passage, and
   the adjustment actuator includes the EGR valve actuator.

3. The controller for an internal combustion engine according to claim 1, wherein
   the internal combustion engine includes
      an intake-side variable valve timing actuator configured to vary opening timing of an intake valve, and
      an exhaust-side variable valve timing actuator configured to vary opening timing of an exhaust valve,
   the adjustment actuator includes the intake-side variable valve timing actuator and the exhaust-side variable valve timing actuator, and
   the EGR control process includes a process configured to cause the opening timing of the intake valve to be more delayed and the opening timing of the exhaust valve to be more advanced when the dither control process is being executed than when the dither control is not being executed.

4. A method for controlling an internal combustion engine including a catalyst that purifies exhaust gas discharged from a plurality of cylinders and an adjustment actuator that adjusts an exhaust gas recirculation (EGR) rate, wherein the cylinders include at least one lean combustion cylinder and at least one rich combustion cylinder, which is different from the lean cylinder, the method comprises:
   executing a dither control process configured to control, in response to a request to increase a temperature of the catalyst being made, fuel injection valves corresponding to the respective cylinders such that an air-fuel ratio in the lean combustion cylinder is controlled to become leaner than a stoichiometric air-fuel ratio and that an air-fuel ratio in the rich combustion cylinder is controlled to become richer than the stoichiometric air-fuel ratio; and
   executing an EGR control process configured to operate the adjustment actuator to control the EGR rate,
   wherein the EGR control process includes operating the adjustment actuator such that the EGR rate is lower in response to the dither control process being executed than when the dither control process is not being executed,
   wherein the dither control process includes a process configured to vary a degree of leanness in the lean combustion cylinder, and
   wherein the EGR control process includes
      operating the adjustment actuator such that the EGR rate is smaller when the degree of leanness in the lean combustion cylinder achieved by the dither control process is large than when the degree of leanness is small,
      a base setting process configured to set a base parameter which is a parameter for setting an operation amount of the adjustment actuator based on an operatingpoint of the internal combustion engine, and a guard value setting process configured to set a guard value for the base, parameter such that, when the dither control process is being executed, the EGR rate is limited to a smaller value when the degree of leanness in the lean combustion cylinder is large than when the degree of leanness is small, and wherein the EGR control process is a process configured to operate the adjustment actuator based on a value obtained by subjecting the base parameter to a guard process with the guard value.

5. A controller configured to control an internal cotbustion engine including a catalyst that purifies exhaust gas discharged from a plurality of cylinders and an adjustment actuator adjusts an exhaust gas recirculation (EGR) rate, wherein the cylinders include at least one lean combustion cylinder and at least one rich combustion cylinder, which is different from the lean cylinder, the controller is configured to execute:

a dither control process, in which, when a request to increase a temperature of the catalyst is made, the controller controls fuel injection valves corresponding to the respective cylinders such that an air-fuel ratio in the lean combustion cylinder is controlled to become leaner than a stoichiometric air-fuel ratio and that an air-fuel ratio in the rich combustion cylinder is controlled to become richer than the stoichiometric air-fuel ratio; and an EGR control process, in which the controller operates the adjustment actuator to control the EGR rate, wherein the EGR control process includes operating the adjustment actuator such that the EGR rate is lower when the dither control process is being executed than when the dither control process is not being executed, wherein the dither control process includes a process configured to vary a degree of leanness in the lean combustion cylinder based on at least one of an engine speed, load, and coolant temperature, and wherein the EGR control process includes
operating the adjustment actuator such that the EGR rate is smaller when the degree of leanness in the lean combustion cylinder achieved by the dither control process is large than when the degree of leanness is small.

6. The controller for an internal combustion engine according to claim 5, wherein the internal combustion engine includes
an EGR passage, which connects an exhaust passage and an intake passage with each other, and
an EGR valve actuator, which adjusts a flow cross-sectional area of the EGR passage, and
the adjustment actuator includes the EGR valve actuator.

7. The controller for an internal combustion engine according to claim 5, wherein the internal combustion engine includes
an intake-side variable valve timing actuator configured to vary opening timing of an intake valve, and
an exhaust-side variable valve timing actuator configured to vary opening timing of an exhaust valve,
the adjustment actuator includes the intake-side variable valve timing actuator and the exhaust-side variable valve timing actuator, and
the EGR control process includes a process configured to cause the opening timing of the intake valve to be more delayed and the opening timing of the exhaust valve to be more advanced when the dither control process is being executed than when the dither control is not being executed.

* * * * *